United States Patent [19]

Arnoldy

[11] 3,735,087

[45] May 22, 1973

[54] METHOD AND APPARATUS FOR ADJUSTABLE METERING

[75] Inventor: Roman F. Arnoldy, Houston, Tex.

[73] Assignee: R. I. Patents, Inc., Houston, Tex.

[22] Filed: Mar. 4, 1971

[21] Appl. No.: 121,220

Related U.S. Application Data

[62] Division of Ser. No. 849,020, Aug. 11, 1969, abandoned.

[52] U.S. Cl. .................................219/73, 219/137
[51] Int. Cl. ............................................B23k 9/12
[58] Field of Search.................219/73, 76, 124–126, 219/137

[56] References Cited

UNITED STATES PATENTS

| | | | |
|---|---|---|---|
| 3,172,991 | 3/1965 | Arnoldy | 219/130 |
| 2,151,914 | 3/1969 | Hopkins | 219/76 X |
| 3,071,678 | 1/1963 | Neely et al. | 219/76 |
| 3,260,834 | 7/1966 | Arnoldy | 219/73 |

*Primary Examiner*—J. V. Truhe
*Assistant Examiner*—L. A. Schutzman
*Attorney*—James F. Weiler, Jefferson D. Giller, William A. Stout et al.

[57] ABSTRACT

The present invention relates to metal metering methods and apparatus such as employed in welding equipment using granular material to form its weld bead; and more particularly, relates to such metering methods and apparatus and the controls therefor. The present invention encompasses the use of methods and control means to provide controlled rates of feed for the granular material, either based on the rate of feed of the electrode or on selected compositions for the weld bead. In addition to the basic method disclosed, a mechanical embodiment of the apparatus is shown which employs a rocker arm or arms and a linkage to transfer motion from a shaft connected to the electrode feed means to the metering wheel. Adjustment is provided for the rocker arm and linkage to adjust the amount of motion that is transferred to each individual metering wheel. An electrical embodiment of the apparatus is also disclosed and this utilizes two controls to limit the current flow to the metering wheel motors, one to adjust the current flow in relation to the rate of feed for the electrode and the second to provide individual control over individual motors, and in turn, over individual metering wheels. The present invention, therefore, provides method and means to give, not only synchronization of the granular feed with the electrode feed, but also over the composition of the total feed by controlling the rate of feed of the individual ingredients.

23 Claims, 9 Drawing Figures

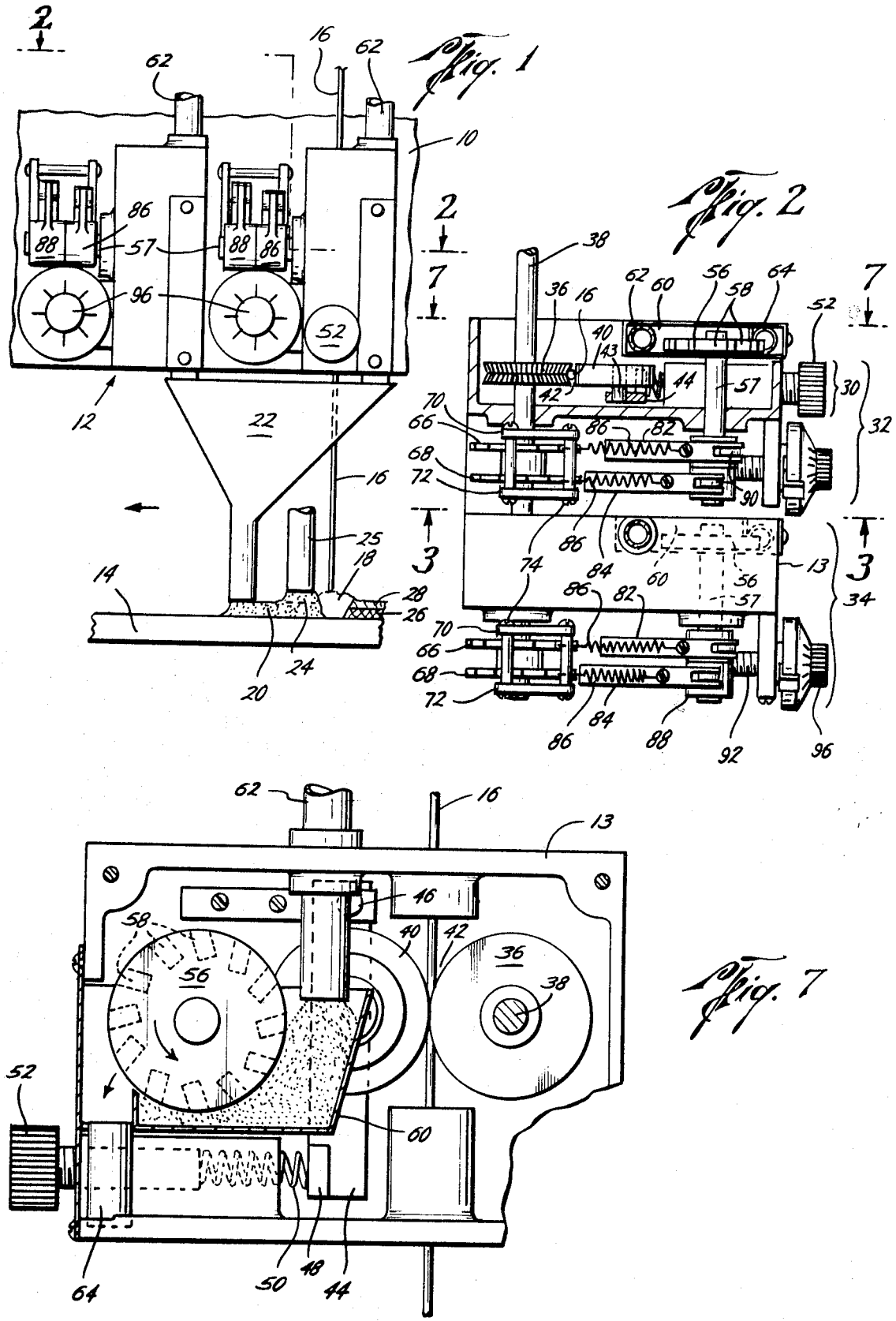

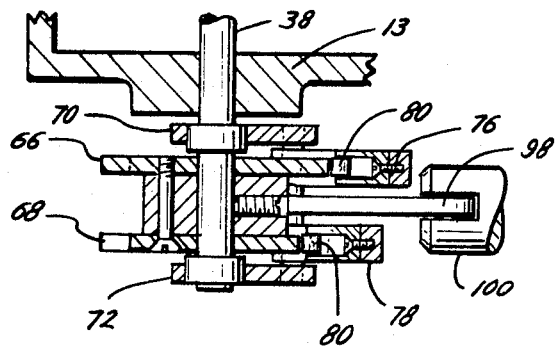
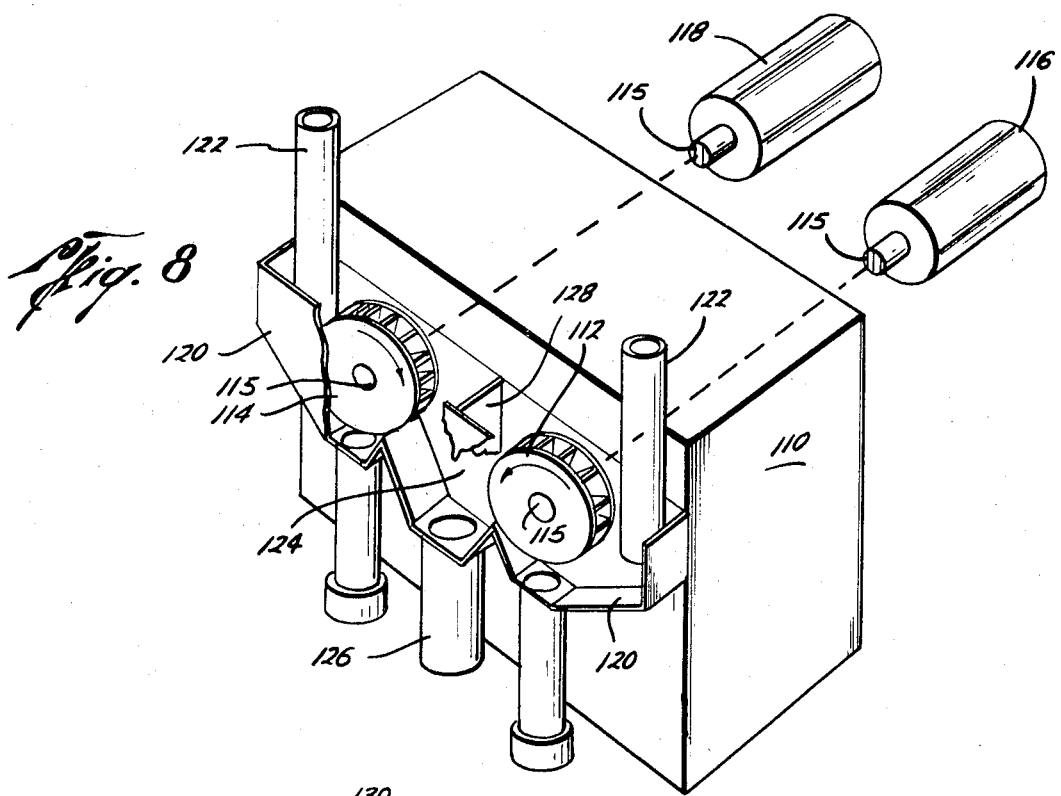
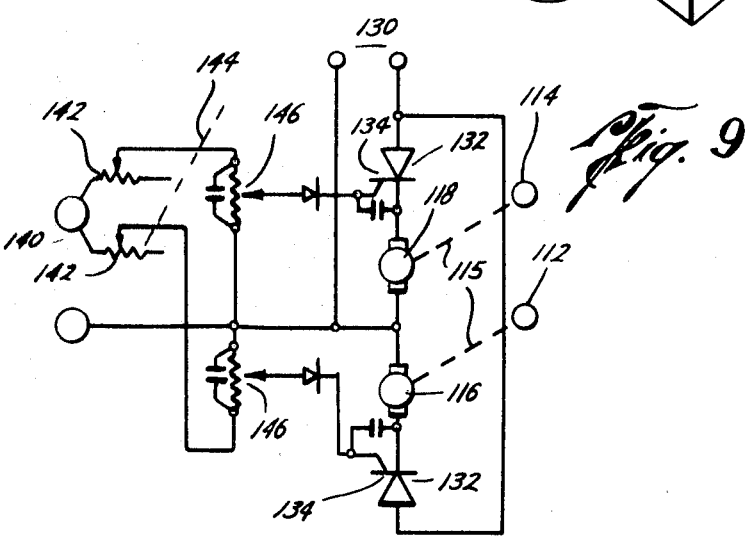

METHOD AND APPARATUS FOR ADJUSTABLE METERING

CROSS-REFERENCES TO RELATED APPLICATIONS

This application is a divisional application of my co-pending application Ser. No. 849,020, filed Aug. 11, 1969, now abandoned, entitled "Method and Apparatus For Adjustable Metering."

BACKGROUND OF THE PRESENT INVENTION

This invention pertains to the field of metering materials, whereby the metering operation can be controlled; and more particularly, metering and control method and apparatus therefor, which are to be used in electric arc welding in which the weld bead is comprised of melted metal from a consumable electrode and from alloy granules.

This last described type of electric arc welding is oftentimes referred to as "bulkwelding" and is generally disclosed in my U.S. Pat. No. 3,076,888, issued Feb. 5, 1963, and entitled "Method of Producing Weld Coatings or Fusion Welds," which patent illustrates several examples of bulkwelding. Furthermore, my U.S. Pat. Nos. 3,172,991 and 3,296,408 illustrate additional techniques which may be used in bulkwelding and apparatus to accomplish these techniques.

Generally, this bulkwelding is accomplished by the continuous supply of a consumable electrode to the welding zone while at the same time supplying a selected mixture of granular material or materials (hereinafter sometimes referred to as "granular"). The weld bead or overlay is formed by the melting of the material in the granular, the electrode, as well as a portion of the base metal onto which the bead is deposited. An overlay or bead of a desired composition may be achieved by varying the amounts of electrode or granular that is fed into the weld zone. Furthermore, it is often desirable to adjust the mix of material during operation and it would be desirable to have method and means to accomplish this readily and easily. In addition, where several granular materials are being used, it is also desirable to be able to adjust the rate of feed of one granular material independently of the rates of feed of the other granular materials or of the electrode.

Furthermore, in automatic arc welding and particularly in weld overlaying, the quality of a deposited bead and the exact analysis of the deposited metal is difficult to predict. This is true because the amount of dilution by the base metal cannot be accurately forecast, and it varies with the analysis and thickness of the workpiece and with the current, voltage and travel speed of the operation, as well as with the fluxing agent used and the viscosity of the molten metal. Further variation results because some elements are burned out in the arc and others are absorbed by the flux while still others may be added. For these reasons, the conditions required to produce a given weld are always determined empirically and such determinations must be made repeatedly. Furthermore, these conditions cannot be exactly repeated with reliability from job to job or even from day to day.

In materials of critical composition, special electrodes are usually made up with compensated compositions, and special fluxes are used which contain metal addition to compensate for the losses expected. After the need is determined, considerable time is required to make up the electrodes needed and/or the fluxes. After perhaps several trials, the necessary combination of electrodes, flux and welding conditions are obtained to produce the alloy balance required in the deposit.

Unfortunately, these conditions do not tend to remain balanced. The workpiece may be different enough in composition from the test plate that the fluidity is changed, which changes the penetration and dilution, upsets the balance and produces an unsatisfactory deposit. Differences in trace element content can cause this effect. Also, different lots of fluxes will behave differently, and thus, produce the same effect. Different lots of electrode materials will vary in composition enough to upset the balance required and change the deposit obtained.

Prior to the present invention, apparatus have been unavailable by which the composition of the alloy granular material could be varied as desired. Operators were, therefore, limited in making changes in composition to having different electrodes made up, or fluxes prepared. These operations were time consuming and resulted in delay and possible substantial expense.

SUMMARY OF THE PRESENT INVENTION

The present invention utilizes metering method and apparatus which accurately meter the granular to the weld zone, and which includes adjusting the rate of feed of each individual metering station to achieve the desired composition, along with method and means to automatically accomplish adjustments in the overall feed of the granule material relative to changes in the rate of feed of the consumable electrode.

The method involved teaches basically the provision of a welding method which includes the steps of feeding a consumable electrode to a weld zone at a predetermined rate of feed; metering a granular material or materials onto the base metal at the weld zone to provide the other ingredients desired in the weld bead; and adjusting, during the welding operation, the rates of feed of the granular with adjustments in the rate of electrode feed, or independently thereof as desired to adjust the weld bead composition. In addition periodic testing of the bead and readjusting of the feed is included to provide the necessary quality control.

Two presently preferred apparatus embodiments are disclosed herein. The first embodiment discussed in the mechanical embodiment and this utilizes one or more rocker arms cooperating with gear means whose rate of rotation varies with the rate of the electrode feed. The rocking motion produced in the rocker arms by the toothed gear means is transmitted to a metering wheel which feeds or "meters" the granular. Clutch means are provided so that the rocking motion is transmitted to the metering wheel shaft in one direction only, thus causing the wheel to rotate in only one direction of rotation. As will be understood, as the electrode feed changes speed, a corresponding change in speed will occur in the gear means and the rocker arm. Thus, the feed of the granular is synchronized with the electrode feed.

Further adjustment is provided by means of adjustable screw means which changes the position of the rocker arm-linkage means relative to the connection through the clutch means to the metering wheel. This change in position also changes the amount of the rocking motion from the rocking arm that is transmitted through the linkage to the wheel. Accordingly, means are provided to change the rate of feed of the granular, not only in response to a change in the rate of feed of the electrode, but also to change the rate of feed of the granular independently of the rate of electrode feed.

This same control is provided by the second embodiment disclosed which utilizes electrical control means. This embodiment employs variable-speed, electric motors to drive the metering wheels which meter the granular materials. Switch means are provided which monitor and control the amount of current allowed to the motors, thereby controlling the speed of the meters, and in turn, the speed of the metering wheels. These switches are in turn controlled by signals transmitted through appropriate circuitry.

These signals are produced firstly, by an appropriate operative connection with the electrode feed means so that the signal increases as the speed of the electrode feed means increases and vice versa. Furthermore, individual controls are contained in the circuit for each motor to provide individual control of the signal independently of the electrode feed.

It is, therefore, an object of the present invention to provide method and means by which granular material may be metered through a metering wheel and which will provide accurate and easily performed adjustments in this rate of feed.

Another object of the present invention is to provide such metering method and apparatus for metering the respective granular materials at a predetermined rate dependent upon the rate of feed of an electrode, and for adjusting the rate of feed of the granular as the electrode feed rate varies so as to maintain the proper proportions.

Still another object of the present invention is to provide such metering methods and apparatus, whereby the rate of feed of the granular may be controlled independently of the electrode feed rate, as well as of the feed rate of the other granular materials.

Still another object is to provide such methods which will be simple and easy to perform, yet which will give a high degree of control and accuracy over the weld being produced thereby.

An additional object is to provide such metering apparatus and the controls therefor which will be relatively inexpensive to manufacture and operate, that will be relatively small in size so as to be carried in a weld head and to be accurate in its metering function and the adjustments thereof.

Another object of the present invention is to provide such apparatus which will provide long service life, and due to its relative simplicity, will be relatively maintenance free.

Other and further objects, features and advantages will be apparent from the following description of the presently preferred embodiments of the invention, given for the purpose of disclosure, when taken in conjunction with the accompanying drawings.

BRIEF DESCRIPTION OF THE DRAWINGS

In the attached drawings, like character references designate like parts throughout the several views, which views are as follows:

FIG. 1 is a side elevation view partially illustrating a weld head into which the present invention may be incorporated, FIG. 2 is a top plan view, partially in section, showing the present invention as seen along Section Lines 2—2 of FIG. 1, FIG. 6 is a partial top view, in section, as seen along Section Lines 6—6 of FIG. 3, FIG. 7 is a side elevation view of the present invention as seen along Section Lines 7—7 of FIG. 2, FIG. 8 is a perspective view of the second embodiment of the present invention, partially in section and partially exploded, and FIG. 9 is a schematic view of an electrical circuit which may be utilized with this second embodiment.

BRIEF DESCRIPTION OF THE PREFERRED EMBODIMENTS

Figure 3:
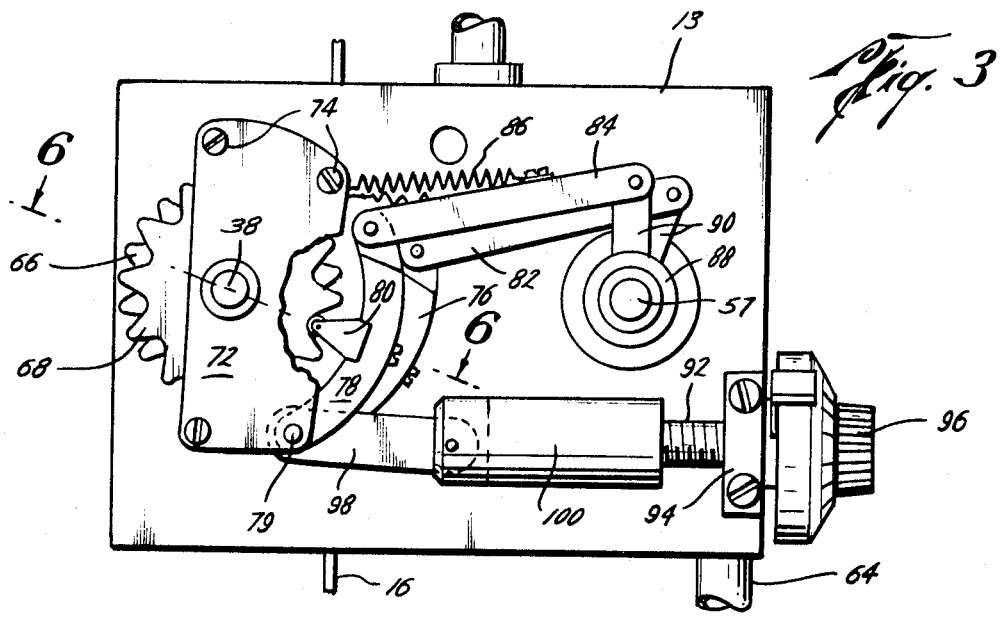
FIG. 3 is a side elevation view as seen along Section Lines 3—3 of FIG. 2.

For purposes of disclosure, the present invention will be described as applied in an automated weld head used in a bulkwelding operation. Although this is the primary application of this invention by far, it is to be understood that the invention claimed herein may be used in other applications where such coordination of the metering functions along with individual adjustment thereof is desired.

Turning now to FIG. 1, there is partially shown a weld head 10 containing therein the present invention generally indicated at 12. The weld head 10 moves over a base metal 14 onto which the weld bead or overlay is applied. A consumable electrode 16 is fed into the weld zone 18 at a predetermined rate. The alloy granular mix 20 is laid upon the surface of the base metal 14 from the funnel 22. In addition, a flux 24 is applied on top of the granular by tube 25.

This welding operation is now well known, but briefly, the electric arc created between the electrode 16 and the base metal 14 creates a weld zone 18 which causes a fusing of the electrode material with the granular material as well as with a portion of the material making up the base metal. This forms a solidified or fused bead 26. The flux or at least a portion thereof is also fused or solidified as at 28. This solidified flux is later removed leaving the overlay 26.

Turning now to FIGS. 2–7, the first embodiment utilizing mechanical control means is disclosed. This particular embodiment shown is made up of three basic components carried in a housing 13. The first component is the electrode feed and adjustment means and is generally indicated by the numeral 30. The second component comprises the metering apparatus and control means therefor for a first granular to be used in the process. This second component is indicated generally by the numeral 32. The third and final component is a second metering apparatus and control means therefor, and this is indicated generally by the numeral 34. It should be understood at the outset that any number of metering apparatus and control means may be utilized with any one electrode feed. This would depend upon the number of ingredients to be included in the granular mix which is to be introduced at the weld zone.

Discussing first the electrode feed means, reference should be made to FIGS. 2 and 7. It should be noted that in most embodiments, the apparatus now to be described does not actually feed the electrode, but instead is driven by the electrode which is driven by conventional means not shown. This disclosed apparatus may, however, if desired, be powered and be the actual driving means for the electrode. It should also be pointed out at this point that although a wire electrode is shown, this invention may be used with other continuously fed, consumable electrodes, such as strip electrodes, tubes filled with granular material, and the like.

The electrode feed means is comprised of a first wheel or cam 36 mounted on a shaft 38. An opposed cam 40 forms a nip 42 with the cam 36. This second cam 40 rotates about a shaft 43 which shaft is secured to a bar 44 which is pivotally mounted about a shaft 46. A bar 48 is acted upon by the spring 50 to urge the cam 40 against the first cam 36 so that a proper pressure is maintained on the electrode to insure the proper rotation of the cam 36 and shaft 38. A knob 52 is threaded to the housing 13 and is available to vary the force exerted by the spring 50 against the second cam 40. In this way, the speed of the second cam 36 will be maintained at a proper relationship with the rate of feed of the electrode 16, varying with variations in the rate of electrode feed.

Turning now to the metering apparatus itself, reference should be made to FIGS. 2-7. Only one such apparatus will be described, it being understood that each unit is the same and identical reference numerals have been utilized to illustrate this. This is also true with regard to the control means for the metering apparatus.

The metering apparatus is comprised basically of a metering wheel 56 having a plurality of openings 58 spaced about its periphery and mounted on a shaft 57 for rotation therewith. This metering wheel is positioned within a hopper 60 into the rear of which is fed the granular material through a tube 62. A second tube 64 extends from the bottom of the hopper 60 in the front portion thereof. This tube 64 leads to the mix hopper 22 (see FIG. 1).

In operation, the metering wheel is rotated by the apparatus to be described below and turns in a counter-clockwise direction as viewed in FIG. 7. This causes the granular material in the hopper to be picked up by the openings 58, which material is then discharged into the tube 64, and from there, into the mix hopper and ultimately to the weld zone. By proper selection of the metering wheel, the openings 58 therein and the speed of rotation of the metering wheel, one can readily see that a proper metering is achieved of the granular fed to the weld zone.

Turning now to the control apparatus which is utilized to impart rotation to the shaft 57 and in turn to wheel 56, reference will be made primarily to FIGS. 2-6. Two toothed gear members 66 and 68 are secured to the shaft 38 for rotation therewith. As can best be seen in FIGS. 3-6, the gears 66 and 68 are offset so that the highest point of any tooth on gear 66 is generally in line with the low point lying between a pair of teeth on gear 68. The purpose for this will be described below.

Mounted about the parallel gears 66 and 68 are parallel plates 70 and 72. These plates 70 and 72 are secured together by any suitable means such as bolts 74, and are freely rotatable about the shaft 38.

Rocker arms 76 and 78 are connected to the plates 70 and 72 respectively. These rocker arms are connected by their lowermost ends in a rotatable fashion, and their uppermost ends are free. Each rocker arm carries a protuberance 80 which bears against the peripheral toothed portion of the gears. It should be noted that the rocker arm 76 bears against the gear 66, while the arm 78 bears against the gear 68.

Rotatably connected to the uppermost ends of the rocker arms 76 and 78 are the links 82 and 84 respectively. Spring members 86 extend between and connect the plates 70 and 72 to the link members 82 and 84, thereby urging the link members, and in turn the rocker arms, toward the gears 66 and 68. It is this spring action that maintains the protuberances 80 in constant engagement with the toothed peripheral surface of their respective gears.

Clutch means 86 and 88, which are conventional apparatus well known to the industry, are mounted about the wheel shaft 57, and each clutch means has an upstanding lug 90 to which is rotatably connected one of the link members 82 and 84. These clutch means act in only one direction so that motion transmitted through the clutch means to the shaft 57 will rotate the shaft in only one direction. Thus, as viewed in FIG. 3, movement of the link 82 or 84 to the right, or in their actuating stroke, will cause a clockwise rotation to be imparted to the shaft 57. When the line members 82 and 84 move to the left in their return stroke, the upstanding lugs 90 will rotate in a counter-clockwise direction, but the clutch will not be engaged with the shaft 57 when rotated in this direction. Thus, this motion will not be transmitted to the shaft 57. This is, however, conventional, and no further explanation of its operation is believed necessary.

Turning now to the operation of this first embodiment, when the welding process is started, the electrode 16 is fed between the cams 40 and 36, imparting rotation to these cams. This in turn rotates the shaft 38, and the gears 66 and 68 secured thereon. Because the rocker arms 76 and 78 are spring biased so that their protuberances 80 are in constant contact with the toothed peripheral surface of these gears, a rocking motion will be imparted to the rocker arms as they pivot about their points of connection 79. This rocking motion is, of course, created by the protuberances 80 riding up and down on the teeth of the gears.

Thus the free end of the rocking members will move back and forth generally toward and away from the clutch means on the shaft 57 as viewed in FIG. 3. This back and forth motion will cause the upstanding lugs 90 to reciprocate through a limiting arc. As previously pointed out, such reciprocal motion by the upstanding lugs in a clockwise direction, as viewed in FIG. 3, will impart rotation to the shaft 57 through their respective clutch means. The return stroke, however, will simply result in the clutch means slipping and no rotation will occur in the shaft 57.

Figure 4:
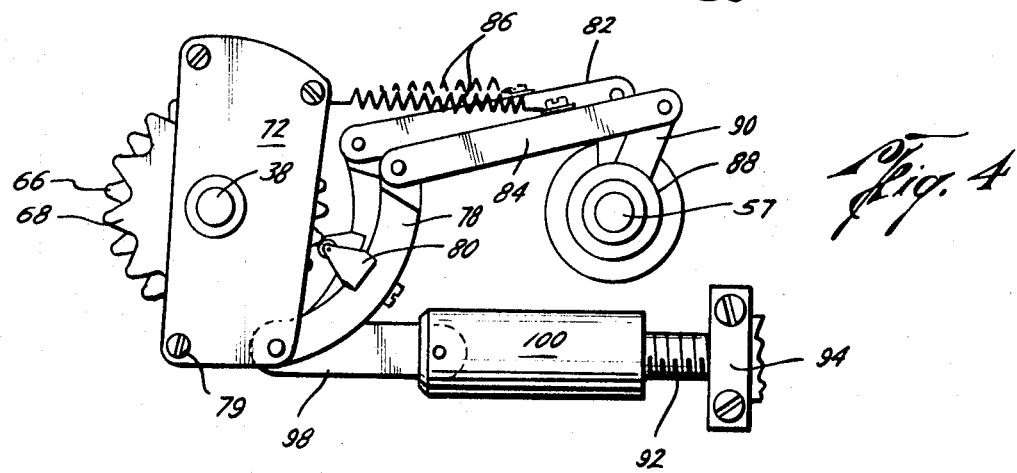
FIG. 4 is a side elevation view of the apparatus shown in FIG. 3, but with the rocker arm and linkage means in a different position from FIG. 3.

Furthermore, the two rocker arms 76 and 78 will rock in generally opposite directions due to the offsetting of the gear teeth on the gears 66 and 68. Thus, when the rocker arm 67 moves toward the clutch means, the arm 78 will be moving away from it, as seen in FIG. 3. Alternately, the arm 78 will then move toward the clutch means, while the arm 76 moves in its return stroke, as shown in FIG. 4. The alternate positioning of the teeth with resulting alternate motion of the two rocker arms is also clearly shown in FIG. 6. Here the arm 78 has completed its return stroke and its protuberance 80 rests in a valley between the teeth on gear 68, while the arm 76 has completed its actuating stroke and its protuberance rides on the crest of a tooth on gear 66.

As will be understood, therefore, this rocking motion imparting the rotation to the shaft 57 will cause the metering wheel to rotate in a counter-clockwise direction as viewed in FIG. 7. This will result in the feeding of the granular into the conduit 64. As will also be understood, as the rate of feed of the electrode increases or decreases, the rotation of the shaft 38, and in turn of the gears 66 and 68, will increase or decrease accordingly. Thus, the motion created in the rocker arms and eventually transmitted to the shaft 57 and metering wheel 56 will increase or decrease in the same manner. By these means, therefore, it is seen that, should the welding operation be speeded up or slowed down by adjusting the rate of speed of the electrode, the rate of speed of the granular materials will be adjusted proportionately, thereby maintaining the proper composition in the weld bead.

Turning now to the means for adjusting the previously described rocker arm-linkage arrangement, a screw 92 is threadedly engaged in the bracket 94 for rotation therein. This screw member 92 does not move, however, along its longitudinal axis relative to the bracket 94. A knob 96 is connected to the screw member 92 for ease of operation thereof. A sleeve 100 threadedly engages the screw 92, whereby it will translate along the length of the screw upon rotation of the screw. This sleeve 100 is connected to the rigidly secured plates 70 and 72 at 79 by means of a link 98.

Figure 5:
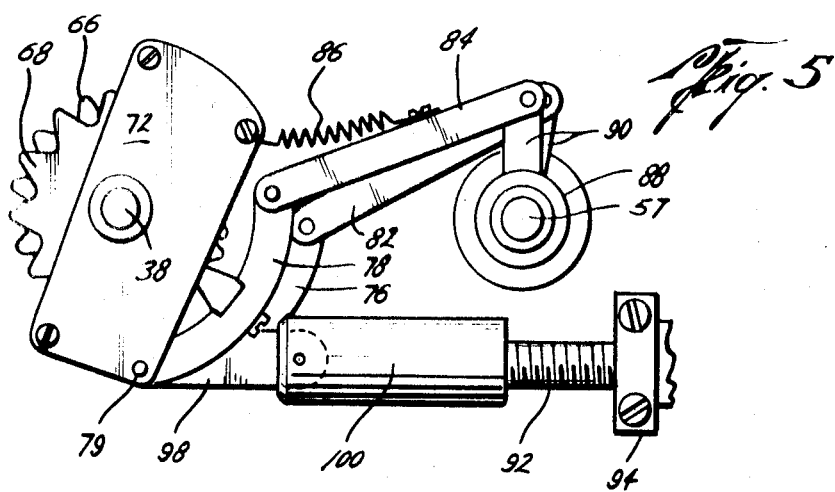
FIG. 5 is a side elevation view of the apparatus of FIGS. 3 and 4, but with the individual control means in a second position from that of FIGS. 3 and 4.

As can be seen by a comparison of FIGS. 3 and 4 on the one hand and FIG. 5 on the other, by rotation of the screw members and translation of the sleeve 100 away from the knob 96, the plates 70 and 72 will rotate about the shaft 38 to a position such as is shown in FIG. 5. When in this position, the free ends of the rocker arms 76 and 78 assume a lower position on the gears 66 and 68. Thus, the rocking movement imparted to the free ends would lie more in a vertical plane than in a horizontal plane as it would, for example, in FIG. 3. Where the rocking motion imparted to the links 82 and 84 is primarily in a horizontal plane, as in FIG. 3, the arc through which the upstanding lugs 90 rotate would be greater, as compared to movement imparted primarily or essentially in a vertical plane. The greater the arc of the movement of the lugs 90, of course, the greater is the rotation of the shaft 57 and metering wheel 56. Where the movement of the free ends of the rocker arms lie more so in a vertical plane, as for example in the position of FIG. 5, the links 82 and 84 will merely rotate about their connecting points on the lugs 90 to a greater extent than they will actually impart reciprocating movement to the lugs 90.

As can be seen from the above explanation and from an examination of FIGS. 3, 4 and 5, therefore, by rotation of the knob 96, adjustment of the sleeve 100 occurs which will cause the plates 70 and 72 to rotate about the shaft 38. Such rotation will change the position of the rocker arms, thus varying the amount of the rocking motion that is transmitted through the links 82 and 84 to the shaft 57. What is accomplished in effect is that the effective stroke of the rocker arms is adjusted to change the speed of the meter wheel shaft with respect to the electrode feed, while maintaining a given relationship to the electrode feed. This has the effect of providing individual control means by which the operator may select the amount of motion or rotation that is to be imparted to each individual metering wheel 56. Thus, close tolerances and precise variations in the feeding of the individual granular ingredients independently of the rate of feed of the electrode 16 are provided for. This is also accomplished without affecting the synchronization between the electrode feed and the granular feed mentioned earlier.

The same result can be accomplished by electrical means as shown in FIGS. 8 and 9. Referring now to FIG. 8, there is shown a housing 110 positioned on one side of which are two metering wheels 112 and 114. The rotation of these metering wheels is brought about by being connected to the shafts 115 of drive motors 116 and 118. The metering wheels are each positioned in their individual hoppers 120 into which the granular materials are fed by tubes 122. The width of the hoppers 120 is substantially equal to the widths of the hoppers 120 is substantially equal to the widths of the metering wheels 112 and 114, and accordingly, the only manner in which the granular material may pass into a mix or central hopper 124 is by action of these metering wheels rotating in the direction shown by the arrows on each wheel. The tube 126 from the mix hopper 124 leads to the welding zone and supplies the mixed granular to this zone. A central partition 128 is also located in the mix hopper 124 to aid in the proper depositing of the granular material being fed into this hopper. The electrode feed is not shown in this embodiment, but it is understood that it is positioned within the weld head in the proper proximity to this metering apparatus so that it will be fed into the welding zone in the well-known manner.

One electrical circuit that may be utilized to control the granular feed is shown in FIG. 9. The connections between the motors 116 and 118 to the metering wheels 112 and 114 are shown schematically.

A first voltage source 130 is connected to each of the motors through silicone control rectifiers 132. These rectifiers change the AC current from the source 130 to DC current to be used by the motors. Each rectifier has a control terminal 134, as is well known in the art. A second voltage source 140 supplies a variable voltage and is connected by appropriate circuitry shown to the control terminal of the rectifiers. This variable voltage from the source 140 is obtained by the two potentiometers 142 which are mechanically linked as at 144. These potentiometers 142 are operatively connected to a feed from the motor feeding the electrode or to a feed from a tachometer measuring the rate of feed of the electrode, so that the voltage supplied from the source 140 varies in proportion to the changes of the rate of feed in the electrode. Due to the linkage 144 between the potentiometers, the voltage varies equally for each of the circuits leading eventually to the two rectifiers 132.

Accordingly, the voltage supplied to the control terminals 134 acts as a signal current which allows current from the source 130 to flow through the rectifiers, thereby actuating the motors 116 and 118. Thus, as the electrode rate of feed increases, the signal supplied from the source 140 will increase with the result of an increased opening of the rectifiers to supply additional current to the motors. This will increase the speed of the motors, thereby increasing the speed of rotation of the metering wheels 112 and 114. The same is true, of course, with a decrease of the electrode feed, resulting in a decreased or lessened signal to the rectifiers and a lessening of the speed of the rotation of the metering wheels.

From the above, it is seen that electrical controls are provided to synchronize the metering of the granular with the electrode feed, in the same manner as the common shaft 38 synchronized the electrode and granular feeds in the mechanical embodiment discussed previously.

Provision is also made for individual control over the feeding of the various granular ingredients used. This is provided by potentiometers 146 which are manually controlled by the operator. As will be understood, and adjustment of the selected potentiometer 146 will result in an increase or decrease in the signal to the corresponding rectifier 132. This will, in turn, increase or decrease, as the case may be, the power flowing to the motor controlled by that particular rectifier.

As will be seen, therefore, provision is made for the operator to control the rotation of the individual metering wheels independently of the remaining metering wheels, as well as of the rate of feed of the electrode. Thus, the operator may vary the composition of the granular mix fed to the welding zone without interfering with the synchronization between the rates of granular relative to the rate of electrode feed. The remainder of the circuit contained in FIG. 9 is conventional and no further explanation is believed necessary.

Having the described the operation of two preferred embodiments of the apparatus that make up a portion of my invention, the method is more clearly seen. This method encompasses a bulk welding method whereby a suitable welding head or machine is moved relative to the base metal on the surface of which the weld bead is to be deposited. Fed from the weld head is a consumable electrode of any suitable type, such as wire or strip. This is fed to a weld zone at a predetermined rate which, it is contemplated, may be adjusted.

Granular material is also fed or metered to the weld zone at predetermined rates. The types and numbers of granular materials used for any particular operation, as well as the rates of feed of each, will vary depending on the bead composition desired. Thus, one operation may use only one granular with the electrode, while another may employ two or more. The use of different granular materials and different numbers of these materials, allows a wide variety of weld compositions without making up special electrodes for each. At the same time, the adjustments described below provide means for maintaining the quality and accuracy of the sought-for composition.

Turning now to these adjustments, the method first teaches the adjusting of each granular feed independently of the electrode feed or of the rates of feed of the other granular materials. Secondly, the present method teaches the automatic adjusting of the feeds of each granular to any adjustments that may take place in the rate of electrode feed. This second adjustment insures that the proportion of each granular relative (1) to each other and (2) relative to the electrode will remain constant. The first adjustment allows operator control of the make up of the bead. In line with this, the method also includes the periodic or selected testing of the bead composition to insure accuracy and to provide a basis for making individual adjustments to the granular feeds.

Finally, an electric arc is created between the electrode and the base metal to create the weld bead as has been previously described. In addition, flux may be deposited over the deposited granular as necessary to the successful operation of the method as is more fully explained in my U. S. Pat. No. 3,076,888.

In conclusion, therefore, it is seen that the present invention and the embodiments disclosed herein are well adapted to carry out the objectives and obtain the ends set forth at the outset. Certain changes can be obviously made in the method and apparatus without departing from the spirit and the scope of this invention. Such changes might include, without limitation, the use of any number of metering and associated control apparatus, depending upon the number of granular materials to be used in the granular mix. Accordingly, an invention in metering has been disclosed which provides method and means by which the composition of the weld bead can be closely controlled and adjusted. The present invention also teaches synchronization between the granular feeds and the electrode feed so that the composition of the weld bead will not vary even though the speed of the welding operation is changed. At the same time, the invention allows the operator to selectively control various ingredients that go into the weld bead in the form of granular materials, so that the proper composition can be selected quickly and easily and can be maintained under varying conditions. The present invention is, therefore, well adapted to carry out the objects and obtain the ends and advantages mentioned, as well as others inherent therein.

What is claimed is:

1. Welding apparatus for use in welding with a consumable electrode and granular material including,
   a weld head,
   electrode feed means for feeding the consumable electrode to a weld zone at a predetermined rate of feed,
   granular material metering means for feeding at least one granular material to the weld zone in controlled amounts,
   linkage means coordinating the rate of feeding of the electrode feed means and the rate of feeding of the granular material metering means whereby the consumable electrode and the granular material are fed to the weld zone in coordinated proportional amounts, and
   control means operative for varying the coordinated rate of feeding of the electrode feed means and the granular material metering means to the weld zone independently of individual changes in the rate of feed of the electrode and the controlled amounts of granular material.

2. The invention of claim 1 where,
   the linkage means includes means responsive to the rate of feed of the consumable electrode for transmitting motion to the granular material metering means.

3. The invention of claim 1 where,
   the linkage means includes,
   a shaft rotatably carried by the apparatus arranged to rotate in response to the feeding of the consumable electrode to the weld zone,
   and where,
   the granular feed means includes, at least one metering wheel arranged to feed the granular material to the weld zone operatively connected to and driven by the linkage means in response to rotation of the shaft.

4. The invention of claim 3 where,
the linkage means includes,
linkage means for each of said metering wheels operatively connecting said wheel to said shaft, whereby the rotation of the shaft imparts movement to each of the linkage means which movement is transmitted to each of the metering wheel, and where,
the control means includes,
control means connected to each of the linkage means for adjusting the amount of movement transmitted to each of said metering wheels.

5. The invention of claim 4 wherein the shaft further includes for each linkage means,
a toothed gear secured to said shaft for rotation therewith, and each linkage means is further defined as including,
a first plate adjacent said gear and rotatably mounted about the shaft,
a rocker arm rotatably mounted on the first plate and being biased against said gear, whereby rotation of the gear will impart a rocking movement to said arm,
a free end on said rocker arm,
each metering wheel being mounted on a wheel shaft for rotation therewith,
a link operatively connecting the rocker arm free end to its respective wheel shaft, 6. The invention of claim 5 wherein each linkage means further includes,
one way clutch means mounted about the wheel shaft and to which said link is connected for imparting movement from said link to said wheel shaft in one direction only.

7. The invention of claim 6 wherein the control means is defined as including,
screw means formed to said welding apparatus for rotation relative thereto, and
a sleeve threadedly engaging said screw means for translation along the length of the screw means upon rotation thereof, said sleeve being secured to the first plate, whereby the first plate rotates about the shaft as the sleeve translates along the screw means.

8. The invention of claim 2 wherein said metering means is comprised of,
a metering wheel for feeding each granular material by rotation of the wheel,
a variable speed motor driving each of the metering wheels,
said control means including,
power circuit means for supplying current to each of said motors for the operation thereof, the speed of the motors varying with the amount of current supplied,
voltage control means for controlling the amount of current supplied to each motor, and
signal control means for control of said voltage control means.

9. The invention of claim 8 wherein,
the voltage control means is controlled by signals sent to the voltage control means by the signal producing means, and the signal control means includes,
signal producing means responsive to the electrode feed means for supplying a signal to the control means in predetermined proportion to the rate at which the electrode is fed.

10. The invention of claim 9 wherein the signal control means includes,
second control means for individually controlling the rate of rotation of each of the metering wheels.

11. The invention of claim 9 wherein including a voltage control means for each motor, the signal control means further including,
means connected to said signal producing means for individually controlling the signals sent to each of said voltage control means.

12. Metering equipment for use in welding apparatus utilizing a consumable electrode and granular materials in its welding process including,
means for feeding the electrode to a weld zone at adjustable rates of feed,
a first shaft rotatably connected to said equipment, the rate of rotation of the shaft varying with the rate of feed of the electrode,
toothed gear means mounted on said first shaft for rotation therewith,
at least one metering wheel to which granular material is supplied, said metering wheel feeding said material into a conduit for conveyance to the welding zone,
a second shaft on which the metering wheel is secured for rotation therewith,
a first plate freely rotatable on said first shaft,
a first rocker arm rotatably secured to said first plate and biased against said gear means,
a protuberance on the first rocker arm maintained in contact with the gear teeth by said bias, whereby rotation of the gear means will impart a rocking movement to the first rocking arm,
link means for transmitting said rocking movement to the second shaft for the rotation thereof, and
control means for varying the amount of the rocking movement that is transmitted to the second shaft.

13. The invention of claim 12 wherein said link means is further defined as including,
clutch means on the second shaft for transferring to the second shaft said rocking movement in one direction only.

14. The invention of claim 13 wherein said clutch means includes,
an upstanding arm, and
said link means further includes a link connecting the first rocker arm to the upstanding arm.

15. The invention of claim 13 wherein the control means is further defined as including,
means for adjusting the position of said first plate about the first shaft.

16. The invention of claim 15 wherein said adjusting means if further defined as including,
screw means rotatably secured to the metering equipment,
a sleeve rotatably engaging the screw means for translation along said screw means upon rotation thereof, said sleeve being connected to the first plate, whereby said translation of the sleeve rotates the first plate about the first shaft.

17. The invention of claim 13 and including,
a second plate freely rotatable on said shaft, a second rocker arm rotatably secured to said plate and biased against said gear means, a protuberance on the second rocker arm maintaining contact with the gear teeth by said bias, whereby rotation of the gear means will impart simultaneous rocking movements to the first and second rocking arms, this simultaneous rocking movement of the first and second rocker arms being in opposite directions relative to each other, said link means being further defined as link means for transmitting the rocking movement of the first and second rocker arms to said second shaft for the rotation thereof, and said control means being further defined as control means for varying the amount of rocking movement transmitted to said second shaft.

18. The invention of claim 17 wherein, the gear means includes a gear for each of the first and second rocker arms, said gears being offset relative to each other whereby the gear teeth will produce said opposite rocking movement in the rocker arms.

19. Metering apparatus for use in welding with a consumable electrode and granular materials to provide a weld including, a plurality of metering wheels for metering the granular materials to a weld zone by rotation of the wheels, a variable-speed electric motor operatively connected to and rotating each of the wheels, electrode feeding means for feeding the electrode to the weld zone, a power circuit for supplying electrical current to each of said motors, signal producing means responsive to the electrode feeding means for producing an electrical signal proportional to the rate at which the electrode is fed to the weld zone, voltage control means for each motor for controlling the amount of electrical current supplied to its respective motor in response to the electrical signal from the signal producing means, and second control means individually controlling the rate of rotation of each of the metering wheels.

20. The invention of claim 19 wherein the signal producing means is operatively connected for supplying the same signal or changes in said signal to all of said voltage control means.

21. The invention of claim 19 wherein the second control means is further defined as, means connected to said signal producing means for individually adjusting the signals sent to the individual voltage control means.

22. The invention of claim 20 wherein the second control means is further defined as, means connected to said signal producing means for individually adjusting the signals sent to each of said voltage control means.

23. The invention of claim 19 wherein each of said voltage control means is defined as including, switch means for opening the current flow to its respective motor in varying amounts and in selected proportion to the magnitude of the signal received, said voltage control means including a control terminal, said first signal producing means including a, second voltage source, a signal circuit for each voltage control means, each of said control terminals being connected to the second voltage source by its signal circuit, signal adjusting means in each of said signal circuits and operatively connected to the electrode feeding means for controlling and adjusting the signal passing to said control terminals, in predetermined proportion to the rate of feed of the electrode, said second control means including, a manually operated control connected to each of said signal circuits for individual control of the signal passing through its circuit independently of the rate of electrode feed.

* * * * *